United States Patent [19]

Anson

[11] 4,138,791
[45] Feb. 13, 1979

[54] FISHING LURE

[76] Inventor: Jay S. Anson, 604 NE. 29th Dr., Apt. C., Fort Lauderdale, Fla. 33334

[21] Appl. No.: 781,563

[22] Filed: Mar. 28, 1977

[51] Int. Cl.² ............................................. A01K 85/00
[52] U.S. Cl. .................................. 43/42.15; 43/42.18; 43/42.25
[58] Field of Search ................. 43/42.11, 42.15, 42.16, 43/42.17, 42.18, 42.25, 42.5, 42.45, 42.13

[56] References Cited

U.S. PATENT DOCUMENTS

| | | | |
|---|---|---|---|
| 1,499,819 | 7/1924 | Goble | 43/42.15 |
| 2,595,168 | 4/1952 | Roth | 43/42.15 |
| 3,740,891 | 6/1973 | Rubenstein | 42/42.15 |
| 3,757,450 | 9/1973 | Martinez | 43/42.15 X |
| 3,881,271 | 5/1975 | Jacura | 43/42.5 |

Primary Examiner—Nicholas P. Godici
Attorney, Agent, or Firm—Malin & Haley

[57] ABSTRACT

A fish lure system including a forward type bait lure and a minnow or baitfish lure connected to and positioned rearward of the bug tupe bait lure whereby the baitfish lure is in pursuit of the bug type bait lure. Both lures are cooperatively linked by a shaft carried by the forward lure. The rear of the shaft is connected to the front of the trailing lure. Both lures are equipped with hooks.

4 Claims, 2 Drawing Figures

FISHING LURE

BACKGROUND OF THE INVENTION

Various combinations of artificial fish bait lures have been disclosed in the past as shown in the Goble U.S. Pat. No. 1,499,819 and Martinez et al, U.S. Pat. No. 3,757,450.

BRIEF DESCRIPTION OF THE INVENTION

This invention relates to a fish lure system that includes a pair of artificial bait lures wherein a main large baitfish plug or minnow is movably linked to a bug type bait lure. This fish lure system provides an illusion that the minnow or baitfish plug is attempting to overtake and devour the bug type lure or creature.

As the bug type lure or creature is pulled through the water by a fishing line connected to its head, the water pressure created about the minnow or baitfish plug or lure as it is dragged through the water causes it to wobble, dart, wiggle and provide swimming action similar to a live minnow or baitfish that is chasing a buglike creature through the water.

This invention has been found to be effective when fishing for all types of fish, salt and fresh water alike, because of the linkage relationship of the bug type lure and the minnow or baitfish lure. This bait offers a live fish two of its most popular natural foods.

It is an object to provide a new fish lure system to provide new and improved lure action in water.

These together with other objects and advantages which will become apparent reside the details of construction and operation as more fully hereinafter described and claimed, reference being had to the accompanying drawing forming a part hereof, wherein like numerals refer to like parts throughout.

DESCRIPTION OF ONE EMBODIMENT

Figure 1:
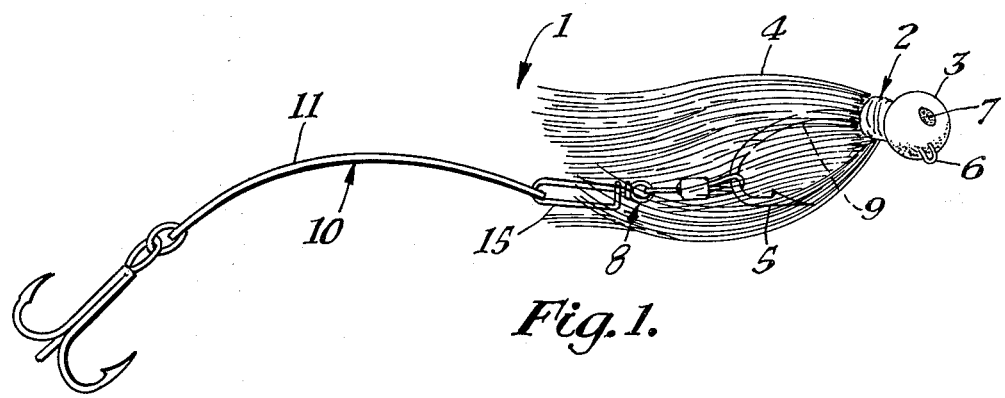
FIG. 1 is a side view of the fish lure system constructed in accordance with the principles of the invention and showing the trapping hooks in their normal set and plane.
Figure 2:
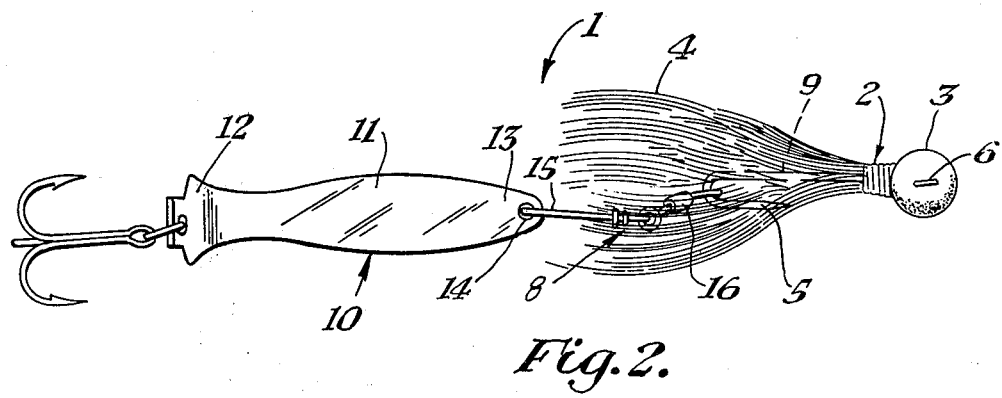
FIG. 2 is a top view of the fishing lure system in FIG. 1.

The fishing system as shown in FIGS. 1 and 2 is of any suitable shape, size, and materials, and is denoted by the numeral 1. The forward bug type lure has a body portion 2, a head portion 3, and a tail portion 4. The tail portion 4 has a hook 5. The head portion 3 has an eye 6 and includes painted eyes 7. One end of a connecting means 8 is connected to the bug type lure to one end and the other end is connected to the minnow-baitfish lure. A fishing line, not shown, is suitable tied or connected to the eye 6 on the head 3. The body of the bug type lure has feathers 4 attached and positioned to project type rearwardly from the rear hook 5 to help conceal the hook and shaft 9. The tail portion 4 of the lures may be made of feathers and hair and various other well known materials to simulate a great variety of buglike creatures. The lure head 3 also acts as a weight as well as an attraction to a live fish.

Referring now to the trailing minnow or baitfish lure 10 connected by connecting means 8 to the bug type lure, the baitfish lure 10 is spaced from the bug type lure 2. The baitfish lure is also of any suitable size, shape and materials and has a body portion 11, a tail portion 12, and a suitable head portion 13. The head portion 13 has an opening 14 that is connected to the connector means 8 of the bug type lure 2. The connector means includes a catch 15 and a swivel 16.

The bait type lure is preferably constructed with the shape as shown. The baitfish may be made in one section with head, body and tail, or may be constructed in several sections, such as head section connected to tail section or head section connected to body section connected to tail section so that the baitfish lure simulates a minnow baitfish chasing a bug through the water.

Any suitable fishhooks may be attached to the baitfish lure in any position with the use of wire, swivels, screws, rods, snaps, direct hook-up or any other desirable way. The preferred hook is connected as shown.

The lure system provides a device that attracts fish by simulating a smaller fish that is feeding.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What is claimed is:

1. A fish lure comprising:
   a bug type lure including:
   a substantially rigid head assembly including,
   a head portion,
   eyelet means affixed to the front end of said head portion for connecting the end of a fishing line,
   a rear body portion consisting of a plurality of thin members,
   a hook portion connected to the rear of said head portion providing,
   an image of a buglike creature,
   a flat baitlike fish lure including,
   a head portion,
   a body portion connected to said head portion,
   a tail portion connected to said body portion,
   eyelet connected to the head portion, and
   a hook connected to said baitfish lure,
   a swivel means connected between said bug type lure and said baitfish lure said swivel means connected to said hook portion of said bug-type lure and to said eyelet of said baitfish lure.

2. A fish lure system comprising:
   a bug type lure, including,
      a substantially rigid head,
      an eyelet means affixed to the lower front of said head for connection to the end part of a fishing line,
      a hook rigidly connected to the center rear of said head, and
      a rear body portion consisting of a plurality of thin members generally parallel to said hook,
      a generally flat baitfish lure, including;
         a head portion,
         a body portion connected to said head portion,
         a tail portion connected to said body portion, and
         a movable hook connected to said tail portion, and
      a swivel means for linking said bug type lure to said baitfish having a front swivel portion connected to said rigid hook of said bug type lure, and a rear swivel portion connected to said head portion of said baitfish lure.

3. A fish lure system as set forth in claim 2, wherein; said baitfish lure is a generally flat fish lure that wobbles, darts and wiggles as it moves through the water at a fixed distance behind said bug type lure, said bug type lure creates eddies that aid in the baitfish lure action behind said bug type lure.

4. A fish lure system as set forth in claim 2, wherein; said baitfish lure is connected a constant distance behind said bug type lure by said swivel means.

* * * * *